US011113623B2

United States Patent
Briański et al.

(10) Patent No.: US 11,113,623 B2
(45) Date of Patent: *Sep. 7, 2021

(54) MULTI-SAMPLE SYSTEM FOR EMULATING A QUANTUM COMPUTER AND METHODS FOR USE THEREWITH

(71) Applicant: Beit Inc., Millbrae, CA (US)

(72) Inventors: Marcin Briański, Chorzów (PL); Witold Jarnicki, Cracow (PL); Łukasz Czerwiński, Wieliczka (PL)

(73) Assignee: BEIT Inc., Millbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,161

(22) Filed: Jan. 12, 2021

(65) Prior Publication Data
US 2021/0133619 A1 May 6, 2021

Related U.S. Application Data

(63) Continuation of application No. 16/835,914, filed on Mar. 31, 2020, now Pat. No. 10,922,618.
(Continued)

(51) Int. Cl.
*G06N 10/00* (2019.01)
*G06F 9/455* (2018.01)
(Continued)

(52) U.S. Cl.
CPC ......... *G06N 10/00* (2019.01); *G06F 9/45508* (2013.01); *G06F 15/80* (2013.01); *G06F 15/82* (2013.01)

(58) Field of Classification Search
CPC ............ G06N 10/00; G06N 3/04; G06N 3/08; G06N 99/00; G06F 9/45508; G06F 15/80;
(Continued)

(56) References Cited

U.S. PATENT DOCUMENTS

2006/0224547 A1 10/2006 Ulyanov et al.
2007/0239366 A1 10/2007 Hilton et al.
(Continued)

FOREIGN PATENT DOCUMENTS

KR 1020180004226 A 1/2018

OTHER PUBLICATIONS

Selby, "Efficient subgraph-based sampling of Ising-type models with frustration", Aug. 25, 2014. (Previously supplied). (Year: 2014).*

(Continued)

*Primary Examiner* — Dave Misir
(74) *Attorney, Agent, or Firm* — Garlick & Markison; Bruce E. Stuckman

(57) ABSTRACT

A system is presented for emulating sampling of a quantum computer having a plurality of qubits arranged in a grid topology with N columns. The system includes a classical processor that is configured by operational instructions to perform operations that include producing final weights and variable assignments for the N columns based on N iterative passes through the grid topology, wherein each of the N iterative passes generates preliminary weights and variable assignments for a corresponding subset of the N columns, wherein the preliminary weights and variable assignments for a selected column of the corresponding subset based on the preliminary weights and variable assignments generated for a column adjacent to the selected column of the corresponding subset, and wherein the sampling of the quantum computer having the plurality of qubits is emulated by producing a plurality of samples from the N iterative passes based on the final weights and variable assignments for each of the N columns.

20 Claims, 7 Drawing Sheets

300

Related U.S. Application Data

(60) Provisional application No. 62/864,765, filed on Jun. 21, 2019, provisional application No. 62/864,778, filed on Jun. 21, 2019, provisional application No. 62/949,764, filed on Dec. 18, 2019.

(51) Int. Cl.
*G06F 15/80* (2006.01)
*G06F 15/82* (2006.01)

(58) Field of Classification Search
CPC .......... G06F 15/82; G06F 15/18; G06F 17/12; G06F 9/455; G06F 17/16; B82Y 10/00; G06G 7/58
USPC ........................................ 706/62, 45; 712/17
See application file for complete search history.

(56) References Cited

U.S. PATENT DOCUMENTS

| | | | |
|---|---|---|---|
| 2015/0052092 A1 | 2/2015 | Tang et al. | |
| 2016/0328253 A1* | 11/2016 | Majumdar | G06F 9/45504 |
| 2017/0116159 A1* | 4/2017 | Hamze | G06N 10/00 |
| 2017/0255629 A1* | 9/2017 | Thom | G06N 10/00 |
| 2017/0286858 A1* | 10/2017 | La Cour | G06F 7/50 |
| 2018/0101784 A1* | 4/2018 | Rolfe | G06F 15/80 |
| 2019/0087388 A1* | 3/2019 | Venturelli | G06F 17/11 |

OTHER PUBLICATIONS

Majumdar, Publication No. KR 1020180004226 A (Jan. 10, 2018). (Previously supplied). (Year: 2018).*

La Cour, et al., "Using Quantum Emulation for Advanced Computation", IEEE, 2017. (Previously supplied). (Year: 2017).*

International Searching Authority; International Search Report and Written Opinion; International Application No. PCT/US202/026580; dated Jul. 22, 2020; 11 pgs.

La Cour, et al. "Using Quantum Emulation for Advanced Computation", IEEE 2017.

Selby, "Efficient subgraph-based sampling of Ising-type models with frustration", Aug. 25, 2014.

* cited by examiner

400

425

450

500

525

MULTI-SAMPLE SYSTEM FOR EMULATING A QUANTUM COMPUTER AND METHODS FOR USE THEREWITH

CROSS-REFERENCE TO RELATED APPLICATIONS

The present U.S. Utility patent application claims priority pursuant to 35 U.S.C. § 120 as a continuation of U.S. Utility application Ser. No. 16/835,914, entitled "MULTI-PASS SYSTEM FOR EMULATING A QUANTUM COMPUTER AND METHODS FOR USE THEREWITH", filed Mar. 31, 2020, which claims priority pursuant to 35 U.S.C. § 119(e) to U.S. Provisional Application No. 62/864,765, entitled "MULTI-PASS SYSTEM FOR EMULATING A QUANTUM COMPUTER AND METHODS FOR USE THEREWITH", filed Jun. 21, 2019, U.S. Provisional Application No. 62/864,778, entitled "MULTI-SAMPLE SYSTEM FOR EMULATING A QUANTUM COMPUTER AND METHODS FOR USE THEREWITH", filed Jun. 21, 2019, and U.S. Provisional Application No. 62/949,764, entitled "DUAL-PASS SYSTEM FOR EMULATING A QUANTUM COMPUTER AND METHODS FOR USE THEREWITH", filed Dec. 18, 2019, all of which are hereby incorporated herein by reference in their entirety and made part of the present U.S. Utility patent application for all purposes.

BACKGROUND OF THE INVENTION

Technical Field of the Invention

This invention relates generally to computer systems and also to quantum computing.

Description of Related Art

Computing devices are known to communicate data, process data, and/or store data. Such computing devices range from wireless smart phones, laptops, tablets, personal computers (PC), work stations, smart watches, connected cars, and video game devices, to web servers and data centers that support millions of web searches, web applications, or on-line purchases every day. In general, a computing device includes a processor, a memory system, user input/output interfaces, peripheral device interfaces, and an interconnecting bus structure.

Classical digital computing devices operate based on data encoded into binary digits (bits), each of which has one of the two definite binary states (i.e., 0 or 1). In contrast, a quantum computer utilizes quantum-mechanical phenomena to encode data as quantum bits or qubits, which can be in superpositions of the traditional binary states.

BRIEF DESCRIPTION OF THE SEVERAL VIEWS OF THE DRAWING(S)

DETAILED DESCRIPTION OF THE INVENTION

Figure 1:
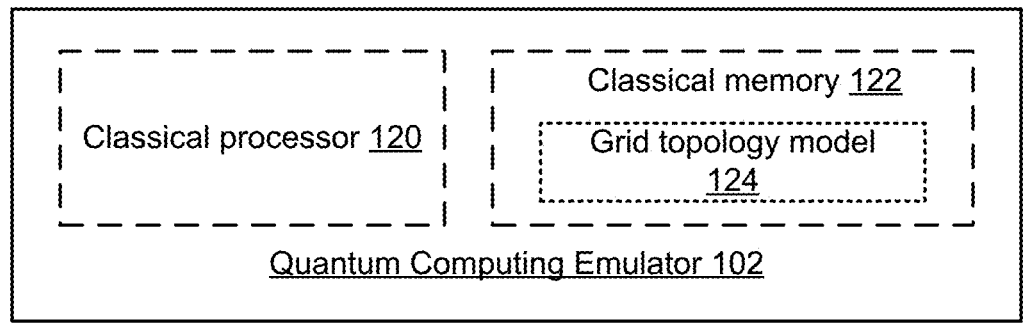
FIG. 1 is a schematic block diagram of an embodiment of a quantum computing emulator in accordance with the present invention.

FIG. 1 is a schematic block diagram of an embodiment of a quantum computing emulator in accordance with the present invention. The quantum computing emulator 102 includes a classical processor 120 and a classical memory 122 that stores a grid topology model 124.

The classical processor 120 includes a processing module and/or one or more other processing devices that operate via classical, rather than quantum computing. Each such processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The classical processor 120 operates in conjunction with an attached memory and/or an integrated memory element such as classical memory 122 or other memory device, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information.

Note that if the classical processor 120 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the classical processor 120 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the classical memory 122 stores, and the classical processor 120 executes, hard coded and/or other operational instructions corresponding to at least some of the steps and/or functions illustrated in one or more of the Figures. Such a memory device or memory element can be tangible memory device or other non-transitory storage medium included in or implemented as an article of manufacture.

The Quadratic Unconstrained Binary Optimization (QUBO) model is a unifying mathematical framework for an important class of optimization problems. The problems involve finding the global minimum of the scalar $y=x^T Q x$ where x is a vector of binary variables and Q is a square matrix of coefficients. The matrix Q, in its upper triangular form, can be defined as follows:

Q[i, i], contains $c_{ii}$ coefficient from $c_{ii}x_ix_i$
Q[i, j], for i<j, contains $c_{ij}$ coefficient from $c_{ij}x_ix_j$
Q[j, i], for i>j, contains 0

If a given QUBO problem contains a limited subset of all possible variable combination pairs $x_i$ and $x_j$ and the dependency between $x_i$ and $x_j$ can be modelled on a grid-based layout, then the QUBO problem can be solved via classical computation as described herein.

The sampling via quantum computer emulator 102 improves the technology of computing by providing the advantages of quantum algorithmic speed for QUBO problems and/or other problems that meet the criteria outlined herein, without the need for expensive and highly complex quantum computing hardware. In this fashion, highly complex problems such as path finding, weather forecasting, artificial intelligence, financial modeling, cryptography, molecular modeling, pattern recognition, particle physics, simulation, multi-dimensional optimization, and other computationally intensive applications can be solved without the need of such special purpose quantum computing computing hardware. While described above in terms of quantum computing emulation, the techniques described herein can be applied to more generalized Boltzmann sampling of a QUBO having a grid topology and/or to other QUBO problems that meet the criteria outlined above.

Figure 2:
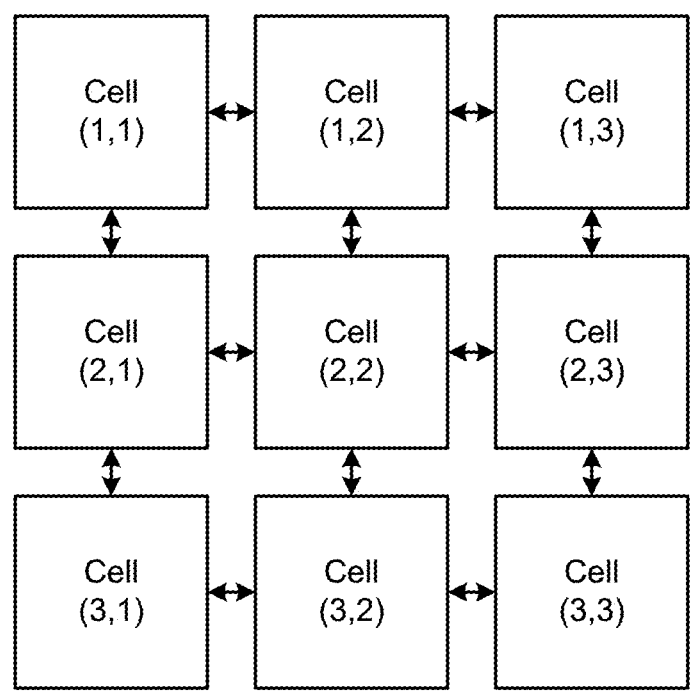
FIG. 2 is a schematic block diagram of an embodiment of a quantum computing architecture in accordance with the present invention.

FIG. 2 is a schematic block diagram 200 of an embodiment of a quantum computing architecture in accordance with the present invention. In the example shown, the grid topology includes a N×N grid of nine cells (N=3) having three columns and three rows. In various embodiments, the grid topology model 124 can correspond to an interconnected grid-based architecture of a quantum computer to be emulated by the quantum computing emulator 102, where each cell in the grid contains a plurality of qubits that are interconnected within the cell and where some qubits are interconnected with another grid elements. It should be noted that, while the terms "columns" and "rows" generally pertain, respectively, to vertical and horizontal one-dimensional arrays of cells of a two-dimensional grid, as used herein, the term "columns" refer to either vertical or horizontal one-dimensional arrays of cells of a two-dimensional grid, particularly because the actual orientation of the cells is arbitrary in the context of computation. Furthermore, while a square grid topology is shown, other non-square rectangles and other grid shapes can likewise be employed.

In various embodiments, the grid topology model 124 can represent a graph of qubits as a tree/subtree structure composed of a family of subtrees. Consider a specific tree decomposition (X, T) of a graph satisfying the following properties:

$|X|=N:=8n^2, X=\{X_1, \ldots, X_N\}$,

T is a list, $T=\{(X_1,X_2), \ldots (X_{N-1},X_N)\}$, $|Xj|\le W:=4n+2, j=1, \ldots, N$.

Alex Selby has proposed a single-pass dynamic programing solution to sampling in "Efficient subgraph-based sampling of Ising-type models with frustration". This approach, however, produces only approximate samples of the Boltzmann distribution and requires data structures that are large enough to store preliminary results for all qubits of the grid.

In contrast, the classical processor 120 performs operational instructions that implement a multi-pass dynamic programming, guided by the family of subtrees, in order to compute multiple properties of a given QUBO instance on the graph in $O(N2^W)$ time. The classical processor 120 can determine the assignment of all variables (both for the minimum state and for a single Boltzmann sample) by performing N properly tailored dynamic-programming passes, giving a total complexity of $O(nN2^W)$ per sample. More precisely, the classical processor 120 can compute any or all of the following:

the minimum attainable energy and associated assignments of variables in $X_N$,
the total Boltzmann weight of all states,
the total Boltzmann weight of the minimum energy states,
the Boltzmann distribution of all assignments of the variables in $X_N$,
the assignment of variables in $X_N$ of a single Boltzmann sample.

In particular, the quantum computing emulator 102 provides a system for emulating the sampling of a quantum computer having a plurality of qubits arranged in a grid topology with N columns. In various embodiments, the classical processor 120 is configured by the operational instructions stored in the classical memory 122 to perform operations that include producing final weights and variable assignments for the N columns based on N iterative passes through the grid topology, wherein each of the N iterative passes generates preliminary weights and variable assignments for a corresponding subset of the N columns, and wherein the preliminary weights and variable assignments for a selected column of the corresponding subset of the N columns based on the preliminary weights and variable assignments generated for a column adjacent to the selected column of the corresponding subset of the N columns and wherein the sampling of the quantum computer having the plurality of qubits is emulated by a sample based on the final weights and variable assignments for each of the N columns.

In various embodiments, a first iterative pass of the N iterative passes generates the final weights and variable assignments for an Nth column of the N columns, based on the preliminary weights and variable assignments generated for a (N−1)st column of the N columns. For example, the corresponding subset of the N columns associated with the first iterative pass of the N iterative passes includes all columns of the N columns in a range between a second column of the N columns and the (N−1)st column of the N columns. The first iterative pass of the N iterative passes generates the preliminary weights and variable assignments for a first column of the N columns, based on based on null weights corresponding to a null column. The last iterative pass of the N iterative passes generates the final weights and variable assignments for a first column of the N columns, based on the final weights and variable assignments for a second column of the N columns and each of the N iterative passes generates the final weights and variable assignments for a corresponding one of the N columns.

In various embodiments, a pth iterative pass of the N iterative passes generates the final weights and variable assignments for an (N−p+1)st column of the N columns, based on the preliminary weights and variable assignments generated for a (N−p)th column of the N columns. The corresponding subset of the N columns associated with the pth iterative pass of the N iterative passes can include all columns of the N columns in a range between a second column of the N columns and the (N−p)th column of the N columns. The grid topology can correspond to a quadratic unconstrained binary optimization (QUBO) model. The sample can correspond to a Boltzmann distribution.

Consider a further example. The classical processor 120 is configured by the operational instructions stored in the classical memory 122 to perform operations that include producing final weights and variable assignments for the N columns based on N iterative passes through the grid topology. Each of the N iterative passes generates preliminary weights and variable assignments for a number of columns of the N columns based on preliminary weights and variable assignments generated for an adjacent column for each of the number of columns. The final weights and variable assignments are generated for a final column of the N columns for each of the N iterative passes based on the preliminary weights and variable assignments generated for a column of the N columns adjacent to the final column of the of the N columns. The final column changes for each pass. Withe the final column being the Nth column in the first pass, the final column being the N$-1^{st}$ column in the second pass, and more generally, the final column being the $(N-p+1)^{st}$ column in the pth pass. The final weights and variable assignments for the final column of the N columns are used in a next successive pass of the N iterative passes to reduce the number of columns of the N columns where the preliminary weights and variable assignments are regenerated until the N iterative passes are complete and final weights and variable assignments for each of the N columns have been generated. The sampling of the quantum computer having the plurality of qubits is emulated by a sample based on the final weights and variable assignments for each of the N columns.

In various embodiments, the processor producing the preliminary weights and variable assignments for the N columns based on the N iterative passes includes:
(1) performing a first pass of the N iterative passes through the grid topology wherein the Nth column of the N columns corresponds to the final column, and wherein the number of columns of the N columns where preliminary weights and variable assignments are generated is equal to N−1; and
(2) performing N−1 other passes of the N iterative passes through the grid topology by:
   (a) setting p=2;
   (b) performing an pth pass through the grid topology, wherein the (N−p+1)th column of the N columns corresponds to the final column, and wherein the number of columns of the N columns where preliminary weights and variable assignments are regenerated is equal to (N−p);
   (c) incrementing n; and
   (d) repeating steps (b) and (c) until p=N.

In various embodiments, the first pass of the N iterative passes through the grid topology includes generating the preliminary weights and variable assignments for the first column of the N columns based on null weights and/or variable assignment corresponding to a null column—in effect, a dummy or phantom column that is placed adjacent to the first column of the grid.

Figure 3:
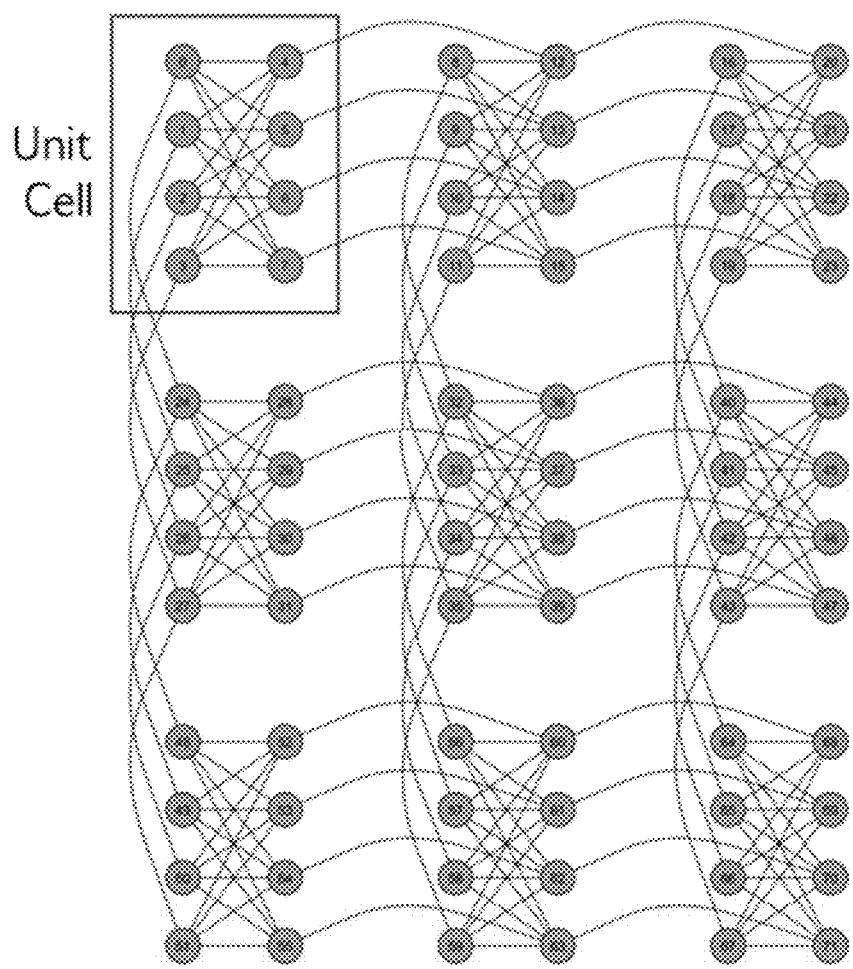
FIG. 3 is a schematic block diagram of an embodiment of a quantum computing architecture in accordance with the present invention.

FIG. 3 is a schematic block diagram 300 of an embodiment of a quantum computing architecture in accordance with the present invention. Like the quantum computing architecture of FIG. 2, the grid topology includes a N×N grid of nine cells (N=3) having three columns and three rows. In the example shown, the grid topology corresponds to a Chimera graph ($C_n$) with 9 interconnected unit cells each having 8 interconnected individual qubits numbered 0-72, having corresponding variables $x_0, x_1, \ldots x_{71}$. While there is a dependency between some variables (e.g. $x_0$ and $x_4$) based on these interconnections, there is no dependency between other variables (e.g. $x_0$ and $x_1$). Because this grid topology presents a QUBO problem that contains a limited subset of all possible variables combinations pairs $x_i$ and $x_j$, and the dependency between $x_i$ and $x_j$ can be modelled on a grid-based layout, then the QUBO problem can be solved via classical computation.

In various embodiments, the classical processor 120 can operate based on the pseudocode below:

```
def calculate_sampling( grid[ Rows ][ Columns ] ):
  ( last_column_variables_assigments[],
    weights and variable assignments[] ) =
  calculate_last_column_solution( grid[ Rows ][ Columns ] )
  ( last_column_variable_assignment, weight) =
    select_one_sample_with_boltzman_distribution(
      last_column_variables assigments[ ],
      weights and variable assignments[ ] )
  for variable_assignment in last_column_variable_assignment:
    if variable_assignment = 0:
      ignore
    elif variable_assignment = 1:
      grid[ Rows ][ Columns - 1 ].xi_coeff +=
      grid[ Rows ][ Columns ].xi_xj_coeff
    return calculate_sampling( qubo Rows ][ Columns - 1 ] )
  last_column_variable_assignment) +
    last_column_variable_assignment
```

A marginal distribution on the last column in each pass can be the computed based on a dynamic programming on the tree decomposition. Consider a specific tree decomposition of a generalized chimera graph $C_n$:
The set of N columns $X=\{X_1, X_2, \ldots, X_N\}$ each consisting of size at most 4n+1 (Nn),
the underlying decomposition is a path $P=\{(X_1,X_2), (X_2, X_3), \ldots, (X_{N-1},X_N)\}$.

Using the dynamic programming approach described above, the quantum computing emulator 102 operates to:
determine a ground energy value along with a corresponding subgraph that minimizes the energy,
determine total weight associated with Boltzmann (Gibbs) distribution,
draw a single sample according to the Boltzmann distribution.

In various embodiments, the classical processor 120 proceeds by computing weights (marginal distribution) of bits (qubits) for each column in the subgraph consisting of columns to the left of it. This is done by starting with 0 (for a phantom empty (null) column to the left of the first one), then transferring the weights from column $X_k$ to $X_{k+1}$ by applying the following equations for each edge e=uv where $u \in X_k$ and $v \in X_{k+1}$:
1. let $w_0$ and $w_1$ be the weights corresponding to some assignment of bits on the boundary of column such that, they differ only by the value assigned to u (this being 0 and 1 respectively), and let d be the energy of the edge uv and b be the energy of vertex v;
2. to compute the weights corresponding to the same assignment of bits, but now with v being the boundary vertex, consider the target weights w'0 and w'1 (likewise corresponding to assigning 0 and 1 respectively to v), then $$w'_0 = w_0 + w_1$$

$$w'_1 = (w_0 + e^{-\beta c} w_1) e^{-\beta b}.$$

Figure 4A:
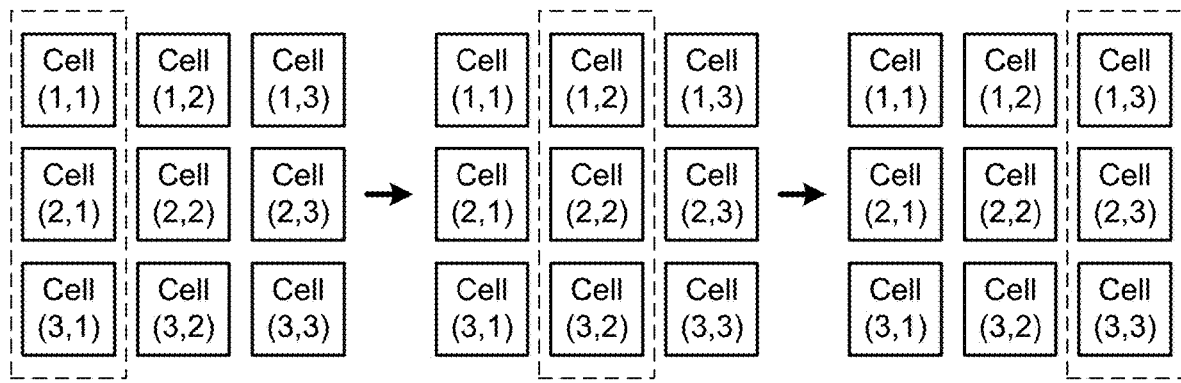
FIGS. 4A, 4B and 4C represent an embodiment of a flow of a multi-pass sampling in accordance with the present invention.
Figure 4B:
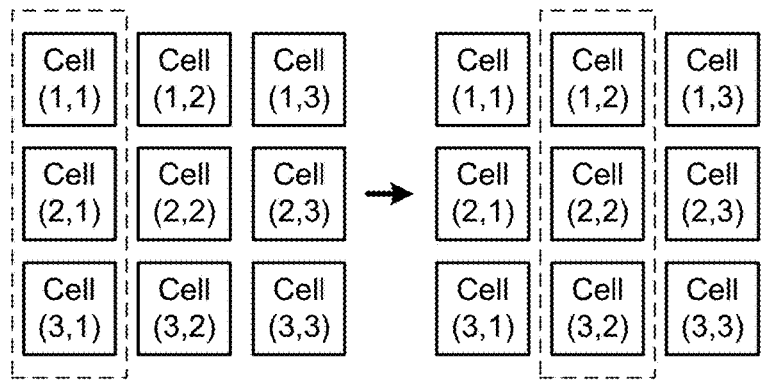
Figure 4C:
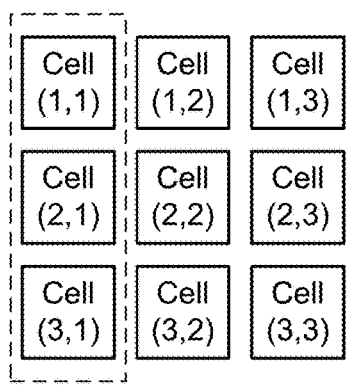

Applying this to the 3×3 example, the classical processor 120 can operate to sample the grid iteratively by proceeding column-by-column in N=3 passes. In particular, FIGS. 4A, 4B and 4C represent an embodiment of a flow diagrams 400,

425 and 450 of a multi-pass sampling in accordance with the present invention. The first pass proceeds from column 1 to 3 as shown in FIG. 4A. The results for the 3rd column are used in the second pass which only requires a pass from column 1 to 2 as shown in FIG. 4B. The third pass finalizes column 1 as shown in FIG. 4C. After 3 passes, the sample is obtained for the entire graph.

While described above in terms of drawing a single sample from the Boltzmann distribution, the techniques described above can be modified to efficiently draw multiple samples from the Boltzmann distribution. Assuming a draw of k samples, the naive approach of sequentially performing the techniques above gives a complexity of $O(knN2^W)$. The method outlined below allows drawing k samples in $O(N(k+N2^W))$. When the term Nk is negligible, the new approach is clearly superior when dealing with significantly more that $O(n)$ samples.

To reach the desired complexity it suffices to show that for any j between 1 and N+1, k partial samples $s_1, \ldots, s_k$ on $X_{j+1}$ can be "pulled back" to k partial samples $t_1, \ldots, t_k$ on $X_j$ in $O(k+N2^W)$ time. This can be obtained by performing the construction of Boltzmann weights on the assignments of variables in $X_{j-1}$ as described above and extending the computation of the weights on assignments of variables in $X_j$ by the following procedure:

1. Initially, for each sample $s_l$ choose a random number $a_l$ uniformly between 0 (exclusive) and the weight of the assignment of $s_l$ in $X_{j+1}$ (inclusive), l=1, ..., k.
2. During the computation of assignment weights and variable assignments, whenever we are about to increase the weight of an assignment s in $X_{j+1}$ by (suitable adjusted) weight w of an assignment t in $X_j$, we decrement all $a_l$ for which $s_l$ corresponds to s by w. Whenever this results in an $s_l$ going from positive to non-positive, we put $t_l:=t$.

As each assignment on $X_{j+1}$ is updated at most twice, the additional steps in 2 above occur at most twice for each sample, hence the complexity desired. This provides that advantage that multiple samples generated with only a fixed increase in computation. Greater efficiency is obtained when the number of extra samples is large.

The techniques described above can be modified in other ways as well. Instead of proceeding through columns 1 to N, then 1 to N−1, etc. in N iterative passes, as long as d≠0, all operations performed are invertible, thus after sampling the last column in the first pass, w'* can be recovered from w* and used (together with the bits of last column) to sample the second to last column, and so on in reverse order. This allows a sample to be drawn via only 2 passes. This changes the complexity of sampling to $O(N n 2^{4n})$.

In operation, the classical processor 120 can perform operations including:

(a) performing a first pass through the grid topology, wherein the first pass includes iteratively generating preliminary weights and variable assignments for N−1 columns of the N columns based on preliminary weights generated for a preceding adjacent column for each of the N−1 columns in a first order from the first column in the N columns to a (N−1)st column of the N columns, wherein final weights are generated for the Nth column based on the preliminary weights generated for a (N−1)st column of the N columns; and (b) performing a second pass through the grid topology by producing final weights and variable assignments for the remaining N−1 columns of the N columns, wherein the second pass includes iteratively generating final weights and variable assignments for N−1 columns of the N columns based on final weights generated for a preceding adjacent column for each of the N−1 columns in a second order from the (N−1)st column of the N columns to the first column of the N columns.

As before, the sampling of the quantum computer is emulated by a sample based on the final weights and variable assignments for each of the N columns.

Figure 5A:
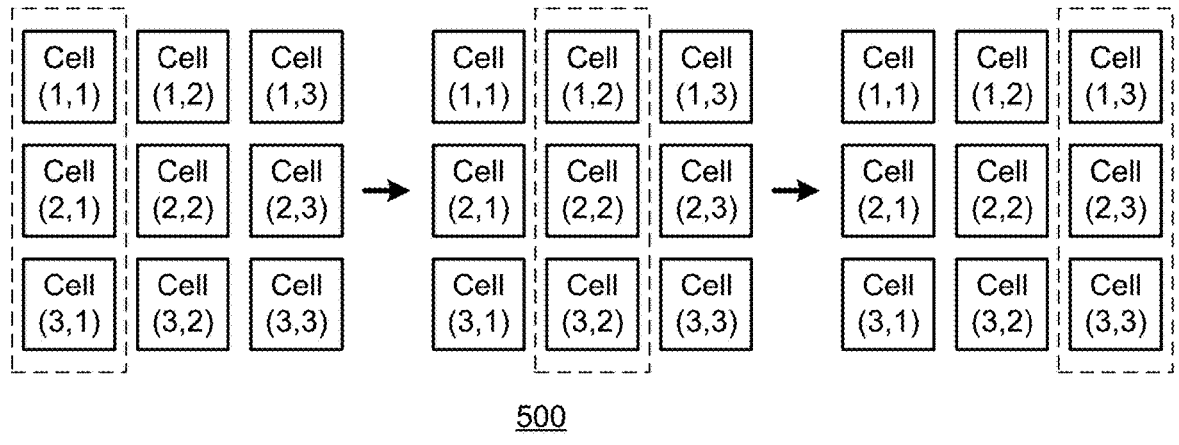
FIGS. 5A and 5B represent an embodiment of a flow of a dual-pass sampling in accordance with the present invention.
Figure 5B:
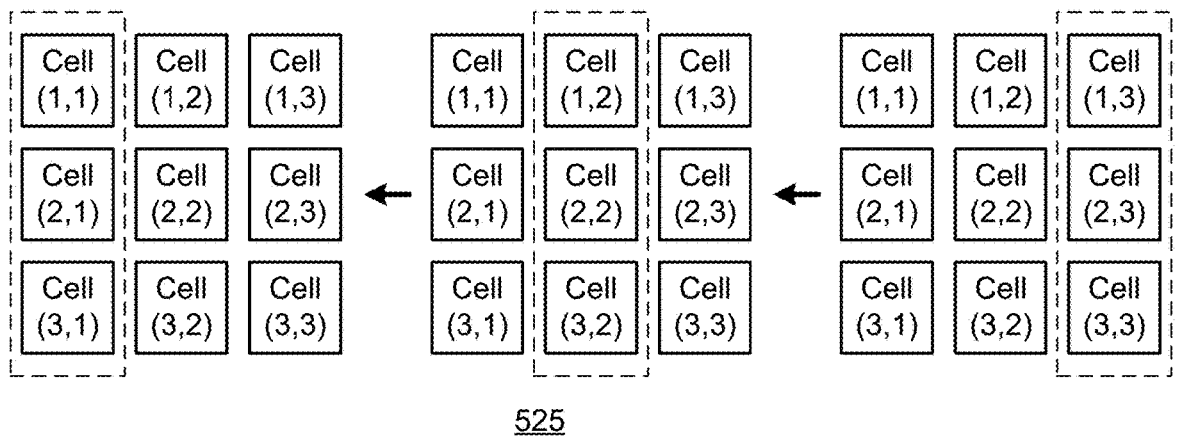

FIGS. 5A and 5B represent an embodiment of flow diagrams 500 and 525 of a dual-pass sampling in accordance with the present invention. The first pass proceeds from column 1 to 3 as shown in FIG. 5A. The results for the 3rd column are used in the second pass which proceeds in the reverse direction back to columns 2 and 1 as shown in FIG. 5B. After 2 passes, the sample is obtained for the entire graph. While described above as drawing only a single sample, the multi-sampling techniques described above can further be modified in this used to draw k samples in 2 passes.

The techniques described above can be modified in other ways. Consider a case where a problem is detected with the graph indicating a low probability of solution via dynamic programing utilizing the particular subtree structures previously described. In this case, the processing switch to dynamic programming via a second structure which uses the leaves of the tree, rather than the subtree structure. When the problem is cleared, the processing can switch back to dynamic programming using the subtree structure previously described. This allows one or more samples to be drawn from graphs that may otherwise be blocked by problems with the particular graph structure.

Figure 6:
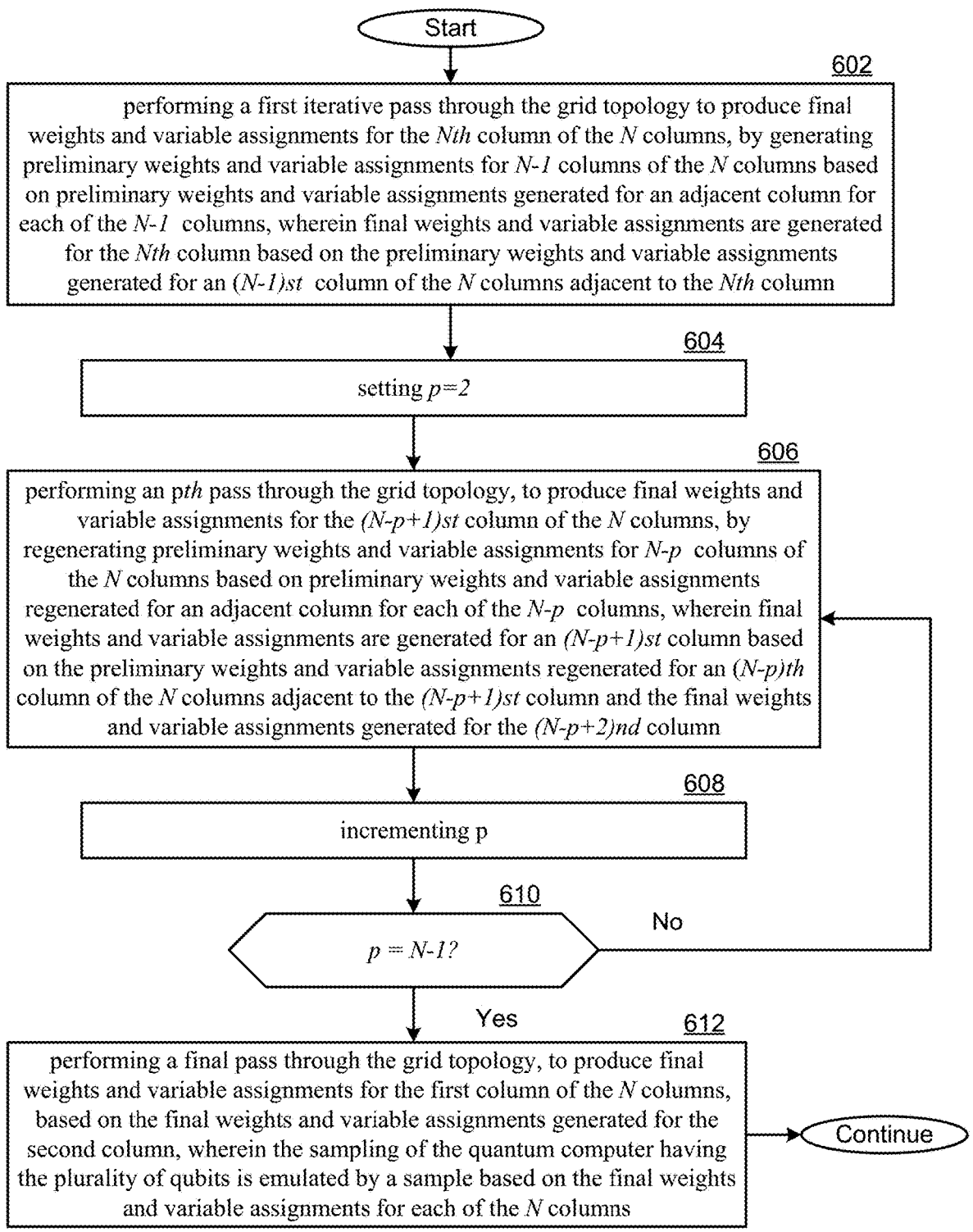
FIG. 6 is a flow diagram of an embodiment of a method in accordance with the present invention.

FIG. 6 is a flow diagram 600 of an embodiment of a method in accordance with the present invention. In particular, a method is presented for use with one or more functions and features described in conjunction with FIGS. 1-5. Step 602 includes performing a first iterative pass through the grid topology to produce final weights and variable assignments for the Nth column of the N columns, by generating preliminary weights and variable assignments for N−1 columns of the N columns based on preliminary weights and variable assignments generated for an adjacent column for each of the N−1 columns, wherein final weights and variable assignments are generated for the Nth column based on the preliminary weights and variable assignments generated for an (N−1)st column of the N columns adjacent to the Nth column, Step 604 includes setting p=2. Step 606 includes performing an pth pass through the grid topology, to produce final weights and variable assignments for the (N−p+1)st column of the N columns, by regenerating preliminary weights and variable assignments for N−p columns of the N columns based on preliminary weights and variable assignments regenerated for an adjacent column for each of the N−p columns, wherein final weights and variable assignments are generated for the (N−p+1)st column based on the preliminary weights and variable assignments regenerated for an (N−p)th column of the N columns adjacent to the (N−p+1)st column and the final weights and variable assignments generated for the (N−p+2)nd column. Step 608 includes incrementing p.

In step 610, the method determines if p=N−1. If no, the method returns to step 606. If yes, the method proceeds to step 612 of performing a final pass through the grid topology, to produce final weights and variable assignments for the first column of the N columns, based on the final weights and variable assignments generated for the second column, wherein the sampling of the quantum computer having the plurality of qubits is emulated by a sample based on the final weights and variable assignments for each of the N columns.

Figure 7:
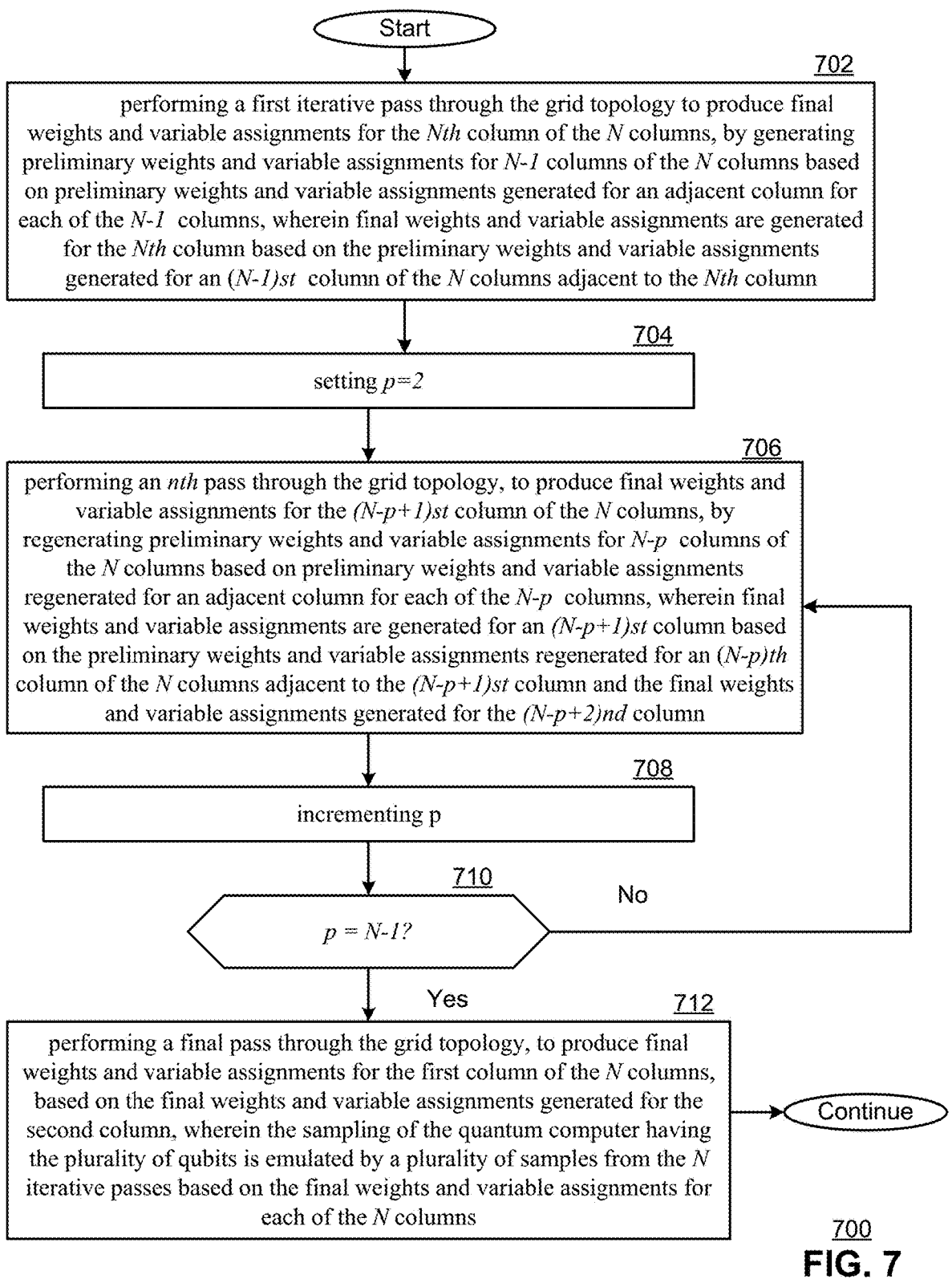
FIG. 7 is a flow diagram of an embodiment of a method in accordance with the present invention.

FIG. 7 is a flow diagram 700 of an embodiment of a method in accordance with the present invention. In particular, a method is presented for use with one or more functions and features described in conjunction with FIGS. 1-6. Step 702 includes performing a first iterative pass through the grid topology to produce final weights and variable assignments for the Nth column of the N columns, by generating preliminary weights and variable assignments for N−1 columns of the N columns based on preliminary weights and variable assignments generated for an adjacent column for each of the N−1 columns, wherein final weights and variable assignments are generated for the Nth column based on the preliminary weights and variable assignments generated for an (N−1)st column of the N columns adjacent to the Nth column, Step 704 includes setting p=2. Step 706 includes performing an nth pass through the grid topology, to produce final weights and variable assignments for the (N−p+1)st column of the N columns, by regenerating preliminary weights and variable assignments for N−p columns of the N columns based on preliminary weights and variable assignments regenerated for an adjacent column for each of the N−p columns, wherein final weights and variable assignments are generated for the (N−p+1)st column based on the preliminary weights and variable assignments regenerated for an (N−p)th column of the N columns adjacent to the (N−p+1)st column and the final weights and variable assignments generated for the (N−p+2)nd column. Step 708 includes incrementing p.

In step 710, the method determines if p=N−1. If no, the method returns to step 706. If yes, the method proceeds to step 712 of performing a final pass through the grid topology, to produce final weights and variable assignments for the first column of the N columns, based on the final weights and variable assignments generated for the second column, wherein the sampling of the quantum computer having the plurality of qubits is emulated by producing a plurality of samples from the N iterative passes based on the final weights and variable assignments for each of the N columns.

In various embodiments, the first iterative pass of the N iterative passes through the grid topology includes generating the preliminary weights and variable assignments for the first column of the N columns based on null weights corresponding to a null column adjacent to the first column of the N columns. The grid topology can correspond to a quadratic unconstrained binary optimization model. The sample can correspond to a Boltzmann distribution.

Figure 8:
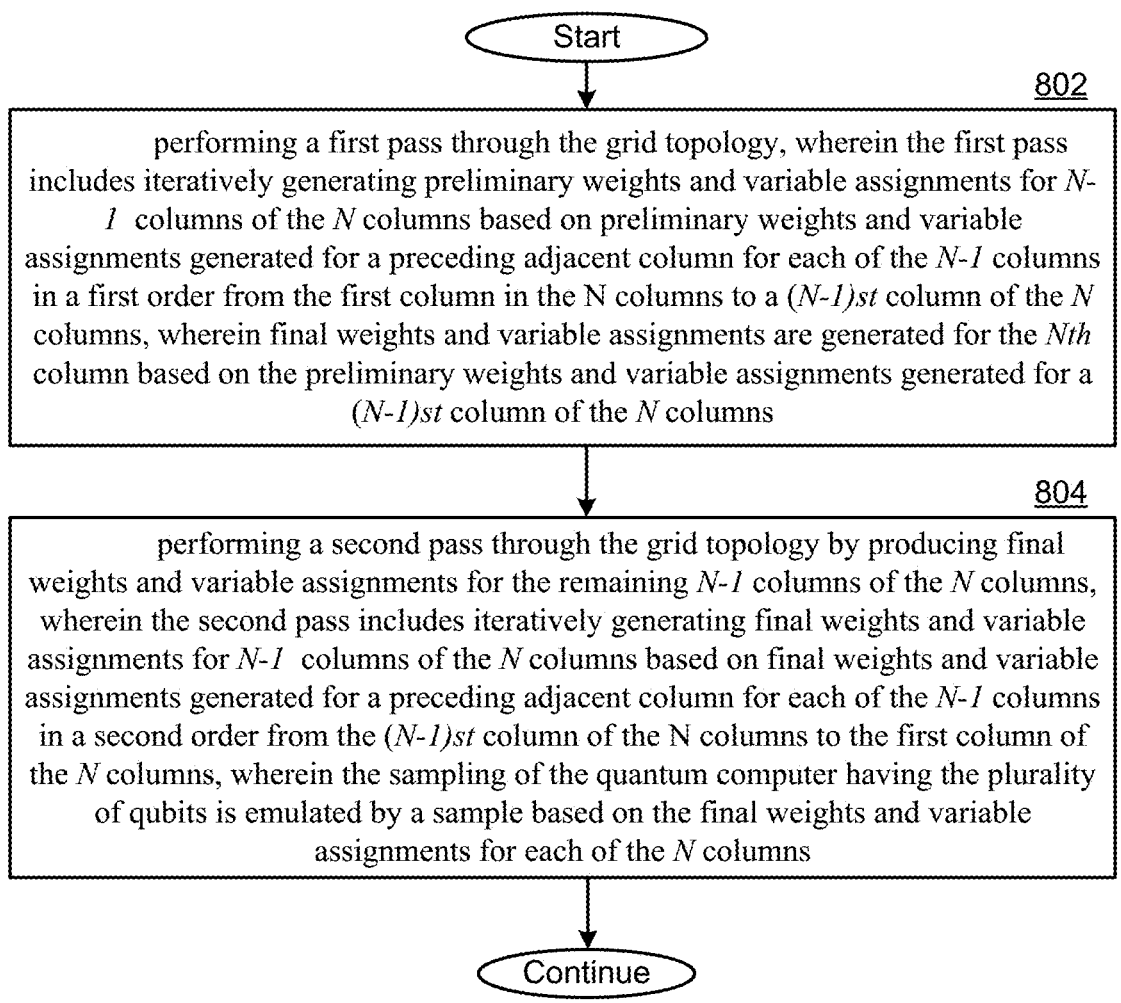
FIG. 8 is a flow diagram of an embodiment of a method in accordance with the present invention.

FIG. 8 is a flow diagram 800 of an embodiment of a method in accordance with the present invention. In particular, a method is presented for use with one or more functions and features described in conjunction with FIGS. 1-7. Step 802 includes performing a first pass through the grid topology, wherein the first pass includes iteratively generating preliminary weights and variable assignments for N−1 columns of the N columns based on preliminary weights generated for a preceding adjacent column for each of the N−1 columns in a first order from the first column in the N columns to a (N−1)st column of the N columns, wherein final weights are generated for the Nth column based on the preliminary weights generated for the (N−1)st column of the N columns.

Step 804 includes performing a second pass through the grid topology by producing final weights and variable assignments for the remaining N−1 columns of the N columns, wherein the second pass includes iteratively generating final weights and variable assignments for N−1 columns of the N columns based on final weights generated for a preceding adjacent column for each of the N−1 columns in a second order from the (N−1)st column of the N columns to the first column of the N columns, wherein the sampling of the quantum computer having the plurality of qubits is emulated by a sample based on the final weights and variable assignments for each of the N columns.

It should be noted that, while the techniques above have been presented for emulating the sampling of a quantum computer having a two-dimensional grid topology, the techniques described herein can be extended to three dimensional grid topologies by producing results for a two-dimensional slice in a multi-pass approach that proceeds column-by-column as outlined above, and then proceeding in a multi-pass approach, slice-by-slice until final results are obtained for the three-dimensional grid.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for emulating sampling of a quantum computer having a plurality of qubits arranged in a grid topology with N columns, the system comprising:
   a memory that stores operational instructions;
   at least one classical processor that is configured by the operational instructions to perform operations, the operations including:
   producing final weights and variable assignments for the N columns based on N iterative passes through the grid topology, wherein each of the N iterative passes generates preliminary weights and variable assignments for a number of columns of the N columns based on preliminary weights and variable assignments generated for an adjacent column for each of the number of columns, wherein final weights and variable assignments are generated for a final column of the N columns for each of the N iterative passes based on the preliminary weights and variable assignments generated for a column of the N columns adjacent to the final column of the N columns, wherein the final weights and variable assignments for the final column of the N columns are used in a next successive pass of the N iterative passes to reduce the number of columns of the N columns where the preliminary weights and variable assignments are regenerated until the N iterative passes are complete and final weights and variable assignments for each of the N columns have been generated;
wherein the sampling of the quantum computer having the plurality of qubits is emulated by producing a plurality of samples from the N iterative passes based on the final weights and variable assignments for each of the N columns.

2. The system of claim 1, wherein the plurality of samples includes k samples and wherein the sampling includes:
for each sample $s_l$, choosing a random number $a_l$ uniformly between zero and the preliminary weight of the assignment of $s_l$ in column j+1 of the N columns, wherein j is an integer and l is an integer between 1 and k;
wherein the generation of the preliminary weights and variable assignments includes, increasing an assignment s in column j+1 of the N columns by the preliminary weight of an assignment t in a column j of the N columns; and
decrement $a_l$ by the preliminary weight of the assignment t in the column j and when this results in $s_l$ going from positive to non-positive, set a final weight of the assignment in the column j of the final weights to t.

3. The system of claim 1, wherein a first iterative pass of the N iterative passes generates the final weights and variable assignments for an Nth column of the N columns, based on the preliminary weights and variable assignments generated for a (N−1)st column of the N columns.

4. The system of claim 3, wherein the number of the N columns associated with the first iterative pass of the N iterative passes includes all columns of the N columns in a range between a second column of the N columns and the (N−1)st column of the N columns.

5. The system of claim 3, wherein the first iterative pass of the N iterative passes generates the preliminary weights and variable assignments for a first column of the N columns, based on null weights corresponding to a null column.

6. The system of claim 3, wherein the last iterative pass of the N iterative passes generates the final weights and variable assignments for a first column of the N columns, based on the final weights and variable assignments for a second column of the N columns.

7. The system of claim 1, wherein a pth iterative pass of the N iterative passes generates the final weights and variable assignments for an (N−p+1)st column of the N columns, based on the preliminary weights and variable assignments generated for a (N−p)th column of the N columns.

8. The system of claim 7, wherein the number of the N columns associated with the pth iterative pass of the N iterative passes includes all columns of the N columns in a range between a second column of the N columns and the (N−p)th column of the N columns.

9. The system of claim 1, wherein the grid topology corresponds to a quadratic unconstrained binary optimization (QUBO) model.

10. The system of claim 1, wherein the plurality of samples each corresponds to a Boltzmann distribution.

11. A method for emulating sampling of a quantum computer having a plurality of qubits arranged in a grid topology with N columns, the method comprising:
performing a first iterative pass of N iterative passes through the grid topology to produce final weights and variable assignments for an Nth column of the N columns, by generating preliminary weights and variable assignments for N−1 columns of the N columns based on preliminary weights and variable assignments generated for an adjacent column for each of the N−1 columns, wherein the final weights and variable assignments are generated for an Nth column based on the preliminary weights and variable assignments generated for an (N−1)st column of the N columns adjacent to the Nth column;
performing N−1 other iterative passes of the N iterative passes through the grid topology by:
(a) setting p=2;
(b) performing an pth pass through the grid topology, to produce final weights and variable assignments for the (N−p+1)st column of the N columns, by regenerating preliminary weights and variable assignments for N−p columns of the N columns based on preliminary weights and variable assignments regenerated for an adjacent column for each of the N−p columns, wherein final weights and variable assignments are generated for an (N−p+1)st column based on the preliminary weights and variable assignments regenerated for an (N−p)th column of the N columns adjacent to the (N−p+1)st column and the final weights and variable assignments generated for the (N−p+2)nd column;
(c) incrementing p;
(d) repeating steps (b) and (c) until p=N; and
(e) performing a final pass through the grid topology, to produce the final weights and variable assignments for a first column of the N columns, based on the final weights and variable assignments generated for a second column of the N columns;
wherein the sampling of the quantum computer having the plurality of qubits is emulated by producing a plurality of samples from the N iterative passes based on the final weights and variable assignments for each of the N columns.

12. The method of claim 11, wherein the plurality of samples includes k samples and wherein the sampling includes:
for each sample $s_l$, choosing a random number $a_l$ uniformly between zero and the preliminary weight of the assignment of $s_l$ in column j+1 of the N columns, wherein j is an integer and l is an integer between 1 and k;
wherein the generation of the preliminary weights and variable assignments includes, increasing an assignment s in column j+1 of the N columns by the preliminary weight of an assignment t in a column j of the N columns; and
decrement $a_l$ by the preliminary weight of the assignment t in the column j and when this results in $s_l$ going from positive to non-positive, set a final weight of the assignment in the column j of the final weights to t.

13. The method of claim 11, wherein a first iterative pass of the N iterative passes generates the final weights and variable assignments for an Nth column of the N columns, based on the preliminary weights and variable assignments generated for a (N−1)st column of the N columns.

14. The method of claim 13, wherein the number of the N columns associated with the first iterative pass of the N iterative passes includes all columns of the N columns in a range between a second column of the N columns and the (N−1)st column of the N columns.

15. The method of claim 13, wherein the first iterative pass of the N iterative passes generates the preliminary weights and variable assignments for a first column of the N columns, based on null weights corresponding to a null column.

16. The method of claim 13, wherein the last iterative pass of the N iterative passes generates the final weights and variable assignments for a first column of the N columns, based on the final weights and variable assignments for a second column of the N columns.

17. The method of claim 11, wherein a pth iterative pass of the N iterative passes generates the final weights and variable assignments for an (N−p+1)st column of the N columns, based on the preliminary weights and variable assignments generated for a (N−p)th column of the N columns.

18. The method of claim 17, wherein the number of the N columns associated with the pth iterative pass of the N iterative passes includes all columns of the N columns in a range between a second column of the N columns and the (N−p)th column of the N columns.

19. The method of claim 11, wherein the grid topology corresponds to a quadratic unconstrained binary optimization (QUBO) model.

20. A system for emulating sampling of a quantum computer having a plurality of qubits arranged in a grid topology with N columns, the system comprising:

a memory that stores operational instructions;
at least one classical processor that is configured by the operational instructions to perform operations, the operations including:
performing a first pass through the grid topology, wherein the first pass includes iteratively generating preliminary weights and variable assignments for N−1 columns of the N columns based on preliminary weights generated for a preceding adjacent column for each of the N−1 columns in a first order from a first column in the N columns to a (N−1)st column of the N columns, wherein final weights are generated for the Nth column based on the preliminary weights generated for a (N−1)st column of the N columns; and
performing a second pass through the grid topology by producing final weights and variable assignments for the remaining N−1 columns of the N columns, wherein the second pass includes iteratively generating final weights and variable assignments for N−1 columns of the N columns based on final weights generated for a preceding adjacent column for each of the N−1 columns in a second order from the (N−1)st column of the N columns to the first column of the N columns;
wherein the sampling of the quantum computer having the plurality of qubits is emulated by a sample based on the final weights and variable assignments for each of the N columns.

* * * * *